United States Patent [19]

Usui et al.

[11] Patent Number: 4,948,180
[45] Date of Patent: Aug. 14, 1990

[54] CONNECTOR FOR TUBE OF SMALL DIAMETER

[75] Inventors: Masayoshi Usui; Kazunori Takikawa, both of Numazu, Japan

[73] Assignee: Usui Kokusai Sangyo Kaisha Ltd., Japan

[21] Appl. No.: 396,958

[22] Filed: Aug. 22, 1989

[51] Int. Cl.[5] ............................................. F16L 39/00
[52] U.S. Cl. ...................................... 285/319; 285/906
[58] Field of Search ......................... 285/314, 340, 906

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,275,907 | 6/1981 | Hunt . |
| 4,451,069 | 5/1984 | Melone . |
| 4,637,636 | 1/1987 | Guest . |
| 4,637,640 | 1/1987 | Fournier et al. . |
| 4,655,486 | 4/1987 | Tarnay ............................... 285/340 |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,836,580 | 6/1989 | Farrrell ............................... 265/319 |
| 4,842,309 | 6/1989 | Lavene et al. ....................... 285/319 |

FOREIGN PATENT DOCUMENTS

| | | |
|---|---|---|
| 733722 | 5/1966 | Canada ............................... 285/319 |
| 593413 | 5/1959 | Italy . |
| 855603 | 12/1960 | United Kingdom . |
| 1029123 | 5/1966 | United Kingdom ................ 285/340 |

Primary Examiner—Dave W. Arola
Attorney, Agent, or Firm—Anthony J. Casella; Gerald E. Hespos

[57] ABSTRACT

A connector connected with a tube having a relatively small diameter, say about less than 20 mm, for supplying oil, air, or the like. The body of the connector has a connecting tubular wall, a communication hole formed in the tubular wall, and a large stepped chamber formed along the axis of the body. A jaw wall protrudes outwardly from the rear end of the chamber. One or more seal rings are mounted in the chamber. A bush member is inserted in the rear portion of the chamber. A socket member has a base wall from which resilient claw walls protrude. The front ends of the claw walls extend into the chamber and are in resilient contact with the outwardly swelling annular portion of the tube.

7 Claims, 5 Drawing Sheets

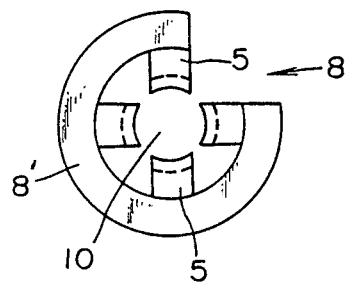
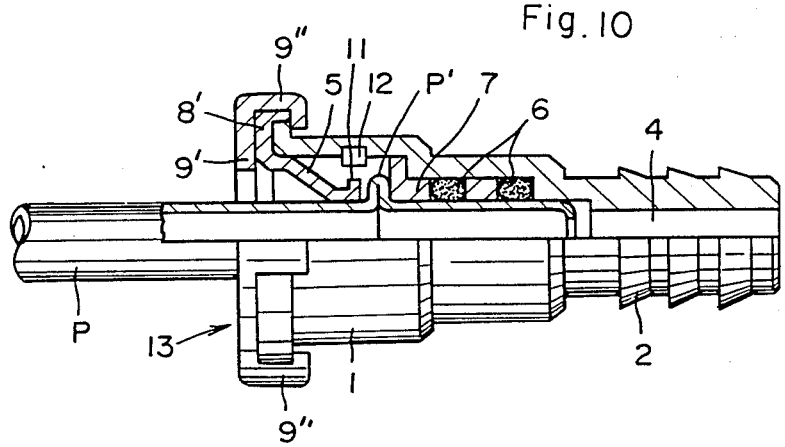
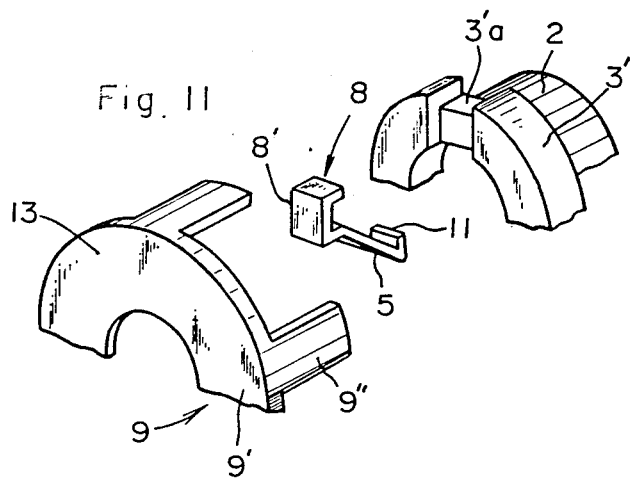

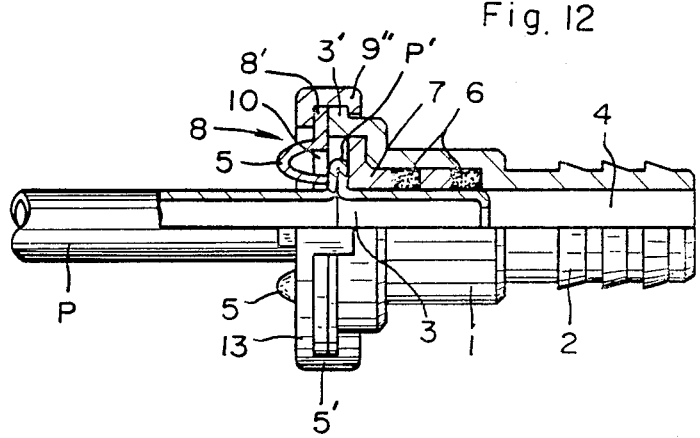
Fig. 12
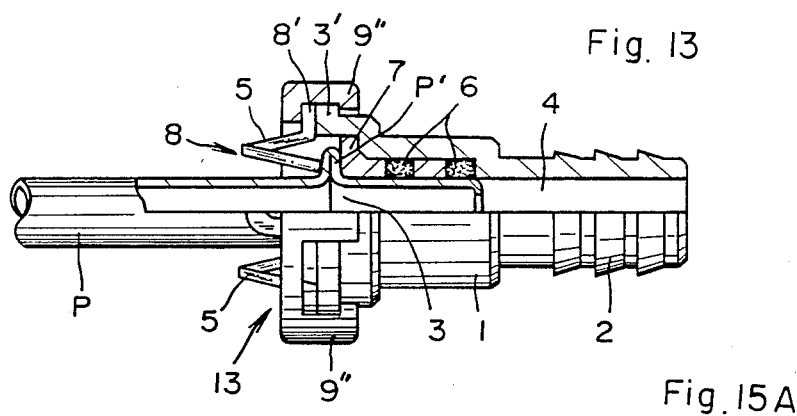
Fig. 13
Fig. 14
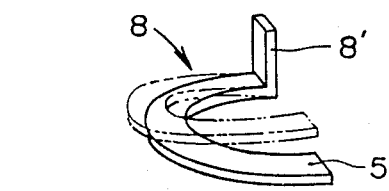
Fig. 15A
Fig. 15B
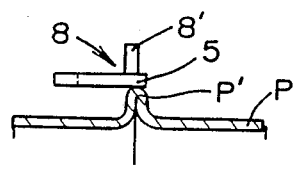

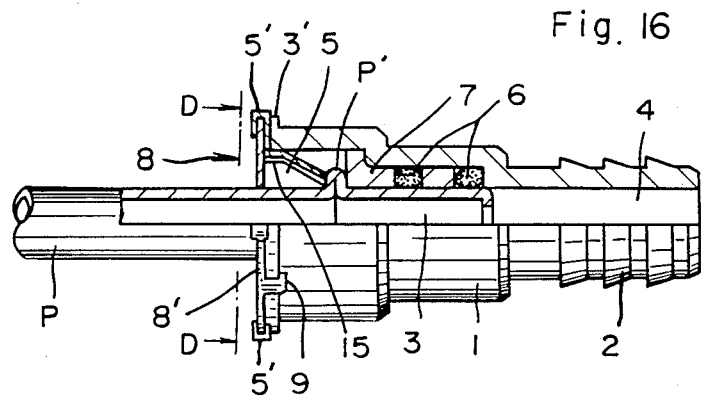
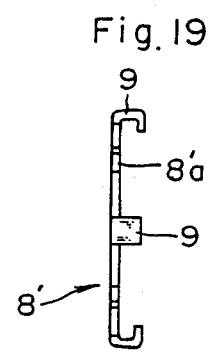
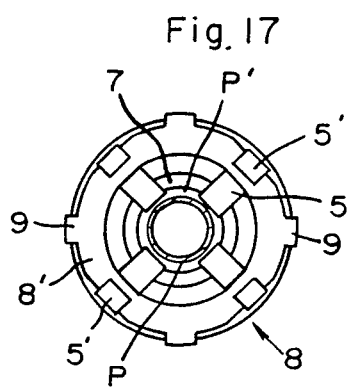
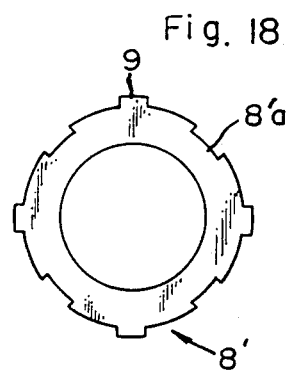
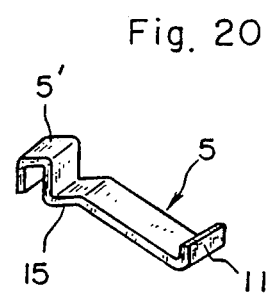
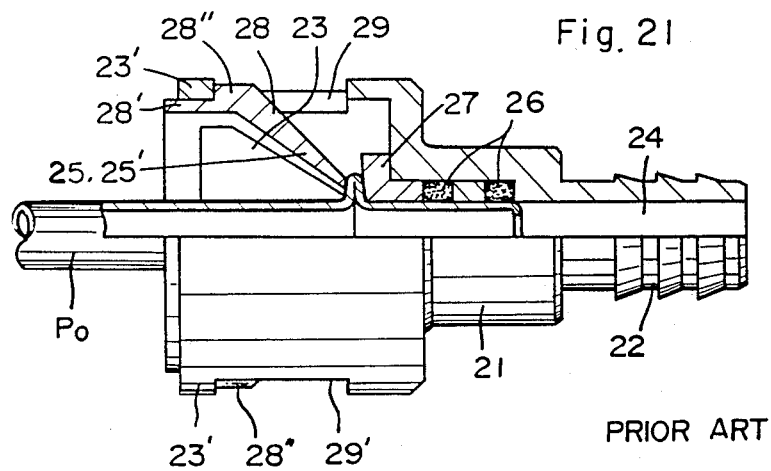
PRIOR ART

CONNECTOR FOR TUBE OF SMALL DIAMETER

BACKGROUND OF THE INVENTION

1. Field of the Invention

The present invention generally relates to improvements in a connector connected with a metallic or resinous tube which is disposed in an automobile, machine, or apparatus to supply oil, air, or the like and the diameter of which is less than about 20 mm.

2. Description of the Prior Art

A conventional connector of this kind is shown in FIG. 21, where the body is indicated by numeral 21. The body 21 has a connecting tubular wall 22 at its front end, and this wall 22 extends along the axis of the body. The body 21 has a large stepped chamber 23 which is in communication with a communication hole 24 formed in the tubular wall 22. The rear end of the tubular wall 22 forms a support wall portion 23'. Seal ring members 26 are mounted in the large chamber 23 and held by the step portion of this chamber 23. A bush member 27 engages the step portion of the chamber 23 and is mounted on the support wall portion 23'. A socket member 28 has claw walls 25 and 25' inclined forwardly, and their front ends are opposite to each other. The socket member 28 has an annular wall 28' near its rear end. The annular wall 28' has a stepped portion mounted on the support wall portion 23'. The tubular wall of the large chamber 23 of the body 21 is provided with slots 29 and 29' in which the claw walls 25 and 25' are engaged. A tube $P_o$ is connected with the large chamber 23 at a point. An outwardly swelling wall portion is mounted near this point inside the chamber 23. The claw walls 25 and 25' are in resilient contact with the swelling wall portion.

In this conventional structure, the rear annular wall 28' of the socket member 28 is mounted on the support wall portion 23' of the body 21 in assembling the connector. At the same time, the claw walls 25 and 25' of the socket member are caused to engage the slots 29 and 29' in the large chamber 23 inside the body 21. Therefore, when the socket member 28 is mounted, the peripheral wall portion of the base portions 28" of the claw walls 25 and 25' is caused to pass through the inside of the support wall portion 23' while compressing the claw walls 25 and 25'. The claw walls are pressed from the rear of the large chamber 23. Consequently, it is necessary that the whole product including the body 21 have a large diameter. Further, the product has a large axial dimension, because the socket member is mounted on the support wall portion 23' which is continuous with the large chamber 23 and with its tubular wall. For these reasons, when the connector is used in limited space, it interferes with other parts, thus frequently presenting problems.

The aforementioned large diameter elongates the claw walls 25 and 25' of the socket member 28. Thus, the force with which the claw walls 25 and 25' make resilient contact with the swelling wall portion of the tube $P_o$ is reduced. Also, permanent set or strain is produced. In this way, the tube $P_o$ may come off while the connector is being mounted. Furthermore, the above-described force may weaken, so that the connector may get loose. Hence, the connection becomes unstable over a long term. In this manner, various problems take place.

SUMMARY OF THE INVENTION

In view of the foregoing problems with the prior art techniques, the present invention has been made.

It is an object of the invention to provide a connector which is for use with a tube having a small diameter and which has small radial and longitudinal dimensions, does not interfere with any other part when the connector is mounted in narrow space, has short claw walls making resilient contact with the swelling wall of the tube with greater force to assure connection for a long term, has a socket member that can be easily attached and detached, and has a fixed structure mounted on the outside of the socket member to make it easy to check with the naked eye if the connection is appropriate or not.

The above object is achieved in accordance with the teachings of the invention by a connector connected with a tube having a small diameter, said connector comprising: a connecting tubular wall formed at the front end of the body of the connector; a communication hole formed in the tubular wall; a large stepped chamber formed along the axis of the body and communicating with the communication hole; a jaw wall protruding outwardly from the rear end of the chamber; at least one seal ring member mounted in the chamber; a bush member inserted in the rear portion of the chamber and taking an annular or short cylindrical form; a socket member having a base wall from which a plurality of resilient claw walls protrude, the front ends of the claw walls extending into the chamber and toward a hole that extends axially of the body and is formed in the center of the body, the resilient claw walls being caused to bear against the base wall of the socket member; and an appropriate fixing means by means of which the claw walls are mounted on the socket member, the front ends of the resilient claw walls being in resilient contact with an outwardly swelling annular wall of the tube mounted in the chamber, the outwardly swelling annular wall being located near the connected end of the tube.

In one feature of the invention, the shape of the base wall of the socket member is usually a continuous annular body. The shape can also be an incompletely annular body. In an extreme case, extensions to the resilient claw walls may be formed to create continuous members. In this case, the socket member consists of a plurality of elements substantially regularly spaced from each other circumferentially on the jaw wall portion of the body.

In the socket member, it is not always necessary that the base walls be integral with the resilient claw walls. They may be formed separately. In this case, they are caused to engage with each other in assembling the connector.

The shape of the resilient claw members is not limited to a simple plate. Rather, a resilient member can be shaped into any desired form, including a substantially U-shaped cross section, according to the application.

The socket member can be mounted to the jaw wall portion of the body by causing plural engaging claw walls to protrude radially from the outer periphery of the annular base walls and crimping the engaging claw walls against the jaw wall portions. In a modified example, a separate fixing member is used, and the base wall is made to engage with the rear fringe surface of the jaw wall. These engaging portions are covered by the fixing member, which is then crimped to fix them.

Since the novel connector for a tube of a small diameter is constructed as described above, the engaging claw walls of the base wall of the socket member are crimped against the outer periphery of the body or fixed to it with the separate fixing member, it is quite easy to attach and detach the socket member. Simultaneously, the diameter of the socket member can be rendered relatively small. In addition, the engaging holes which would have been heretofore formed in the tubular wall of the large chamber in which the claw wall portions are engaged are dispensed with. For this reason, the length of the body can be decreased. The use of the short resilient claw walls permits the whole connector to be fabricated in smaller size. Because the short resilient claw walls are employed, they are rigidly fixed to the swelling wall portions of the tube. This reduces the possibility that permanent set or strain is produced. Also, the tube is less likely to come off or get loose. Hence, the connection can be maintained certainly for a long time.

BRIEF DESCRIPTION OF THE DRAWINGS

FIG. 9 is a rear view of a modification of the socket member shown in FIG. 5;

FIG. 10 is a view similar to FIG. 5, but showing another modification of the connector shown in FIG. 5;

FIG. 11 is a fragmentary exploded perspective view of the resilient claw walls and the socket member shown in FIG. 10;

FIG. 12 is a partially cutaway vertical cross section of a further connector connected with a tube of a small diameter and fabricated in accordance with the invention;

FIG. 13 is a view similar to FIG. 12, but showing a modification of the connector shown in FIG. 12;

FIG. 14 is a vertical cross section of the socket member shown in FIG. 12;

FIG. 15A is a perspective view of the socket member shown in FIG. 13;

FIG. 15B is a view illustrating the manner in which an annular swelling portion passes when the socket member shown in FIG. 15A is used;

FIG. 16 is a partially cutaway vertical cross section of a yet other connector connected with a tube of a small diameter and fabricated in accordance with the invention;

FIG. 17 is a cross-sectional view taken on line C—C of FIG. 16;

FIG. 18 is a plan view of the annular base portion of the socket member shown in FIG. 16;

FIG. 19 is a side elevation of the base wall portion of the socket member shown in FIG. 18;

FIG. 20 is a perspective view of the resilient claw walls shown in FIG. 16; and

FIG. 21 is a partially cutaway vertical cross section of a conventional connector connected with a tube of a small diameter.

DETAILED DESCRIPTION OF THE PREFERRED EMBODIMENTS

Figure 1:
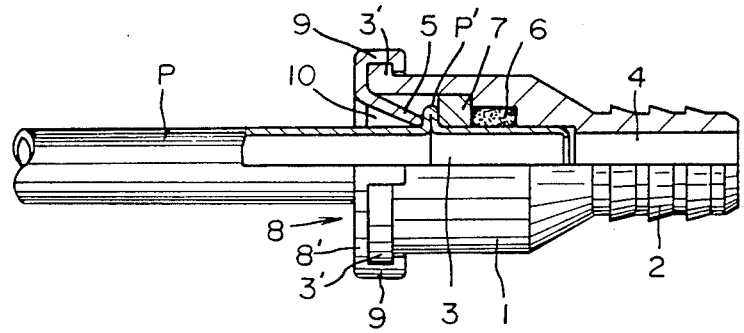
FIG. 1 is a partially cutaway vertical cross section of a connector connected with a tube of a small diameter and fabricated in accordance with the invention.
Figure 2:
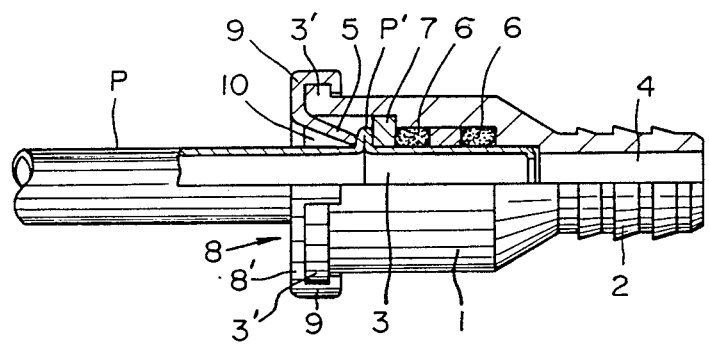
FIG. 2 is a view similar to FIG. 1, but showing a modification of the connector shown in FIG. 1.
Figure 3:
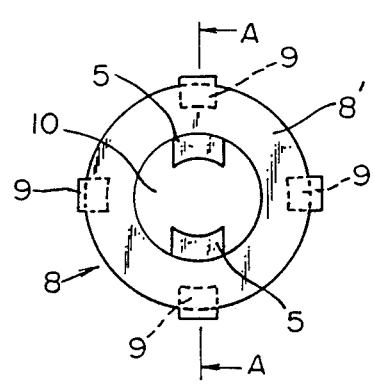
FIG. 3 is a plan view of the socket member shown in FIG. 1.
Figure 4:
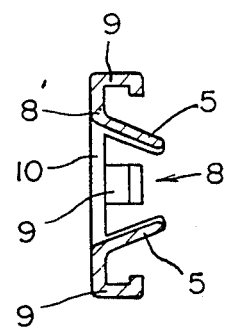
FIG. 4 is a cross-sectional view taken on line A—A of FIG. 3.

A first embodiment of the connector according to the invention is shown in FIGS. 1, 2, 3, and 4. The connector is designed to be connected with a tube having a small diameter. The connector shown in FIG. 2 is a modification of the connector shown in FIG. 1.

In these figures, the body of each connector is indicated by numeral 1. The body 1 is provided with a large stepped chamber 3 and a communication hole 4 formed along the axis of the body. The communication hole 4 is defined by a connecting tubular wall 2 for connection with a resinous tube or rubber hose (not shown) at the front end of the body 1. The stepped chamber 3 is continuous with the hole 4. A jaw wall 3' protruding outwardly is formed at the rear end of the chamber 3. One seal ring member 6 (FIG. 1) or plural seal ring members 6 (FIG. 2) made from an elastic material such as rubber are mounted in the large chamber 3. If desired, one or more spacers are interposed between the ring members. A bush member 7 engages with the step portion of the chamber behind the seal ring member or members 6 to hold them.

A socket member 8 is made from a resilient metal or resin and has a base wall 8'. A plurality of elongated resilient claw walls 5 are formed integrally with the base wall 8'. The front ends of the claw walls 5 are inclined toward the inner wall surface of a hole 10 and forwardly of the large chamber. The hole 10 is formed in the center of the socket member 8 and extends axially of it. A plurality of engaging claw walls 9 are formed on the outer periphery of the base wall 8' and protrude radially. The base wall 8' bears on the rear fringe of the jaw wall 3' of the body 1. The engaging claw walls 9' are crimped against the base wall 8' to fix the socket member 8. A tube P has an annular and outwardly swelling wall P' near its connected end. The swelling wall P' is mounted in the large chamber 3. Under this condition, the front ends of the resilient claw walls 5 are in resilient contact with the tube, whereby the connector is connected to the tube. The socket member 8 can also be fixed by the engaging claw walls 9 in the manner described below. After inserting the tube P, the resilient claw wall 5 are pressed against the swelling wall P'. The front ends of the engaging claw walls 9 are bent inwardly to crimp the claw walls 9 against the tube.

As described thus far, in the first embodiment, the plural resilient claw walls 5 protrude from the base wall 8'. The front ends of the claw walls 5 are inclined toward the front of the large chamber 3 and also toward the inner wall surface of the hole 10 extending axially through the socket body. The plural engaging claw walls 9 protrude from the outer periphery of the base wall 8' and are integral with the annular socket member 8. The engaging claw walls 9 are crimped against the jaw wall 3' of the body 1 by the socket member 8. As a result, the socket member 8 is fixed. Thus, it is quite easy to attach and detach the socket member 8. Concurrently, the diameter of the socket member 8 can be made relatively small. Also, the axial dimension of the finished body 1 is small. Hence, the whole product can be made very compact. Accordingly, when the connector is disposed, it will not interfere with any other part. Because of the structure of the short resilient claw walls 5, they are rigidly fixed to the annular swelling wall P' of the tube P. In this way, engagement can be made effectively. Consequently, the connection is retained certainly over a long term. Furthermore, the above-described fixed structure facilitates checking the validity of the connection by external visual observation. In this manner, the novel connector has quite useful advantages.

Figure 5:
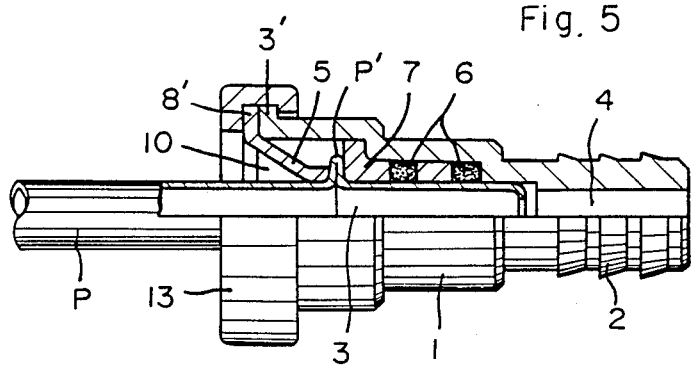
FIG. 5 is a partially cutaway vertical cross section of another connector connected with a tube of a small diameter and fabricated in accordance with the invention.
Figure 6:
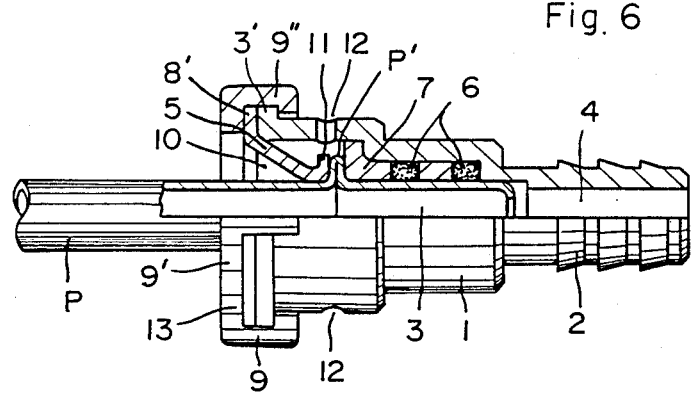
FIG. 6 is a view similar to FIG. 5, but showing a modification of the connector shown in FIG. 5.
Figure 7:
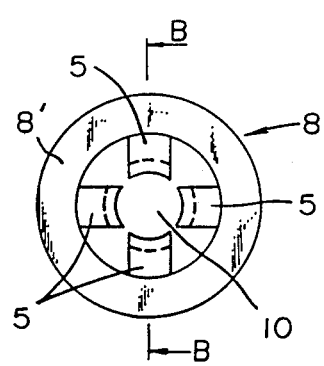
FIG. 7 is a rear view of the socket member shown in FIG. 5.
Figure 8:
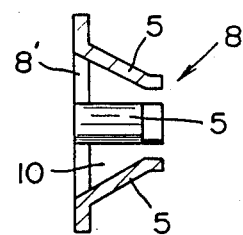
FIG. 8 is a cross-sectional view taken on line B—B of FIG. 7.

A second embodiment of the invention is next described by referring to FIGS. 5-11. In this embodiment, a socket member is fixed to the jaw wall portion of the body by a separate fixing member. FIGS. 5, 6, and 10 show different specific examples of the second embodiment. FIGS. 7 and 8 show only the socket member shown in FIG. 5. FIG. 9 shows a modification of the socket member shown in FIG. 5. FIG. 11 shows the relation among a socket member, a fixing member, and the jaw portion of the body. This socket member consists of resilient claw walls integral with a base wall. It is to be noted that like components are denoted by like reference numerals in various figures including FIGS. 1-4.

In FIGS. 5-11, the body of each connector is indicated by numeral 1. The body 1 is provided with a large stepped chamber 3 and a communication hole 4 formed along the axis of the body. The communication hole 4 is defined by a connecting tubular wall 2 for connection with a resinous tube or rubber hose (not shown) at the front end of the body 1. The stepped chamber 3 is continuous with the hole 4. A jaw wall 3' protruding outwardly is formed at the rear end of the chamber 3. A plurality of seal ring members 6 made from an elastic material such as rubber are mounted in the large chamber 3. If desired, one or more spacers are interposed. A bush member 7 engages with the step portion of the chamber behind the seal ring members to hold them. The bush member 7 takes an annular or short cylindrical form.

A socket member 8 is made from a resilient metal or resin and has an annular base wall 8'. A plurality of elongated resilient claw walls 5 are formed integrally with the base wall 8'. The front ends of the claw walls 5 are inclined toward the inner wall surface of a hole 10 and forwardly of the large chamber. The hole 10 is formed in the center of the socket member 8 and extends axially of it.

While the annular base wall 8' of the socket member 8 bears on the rear fringe of the jaw wall 3' of the body 1, the overlapping peripheral wall portions are joined together by a separate annular fixing member 13. Preferably, the fixing member 13 is crimped against the base wall 8' of the socket member 8. A tube P has an annular and outwardly swelling wall P' near its connected end. The swelling wall P' is mounted in the large chamber 3. Under this condition, the front ends of the resilient claw walls 5 are in resilient contact with the tube, whereby the connector is connected to the tube.

The fixing member 13 is not limited to the structure shown in FIG. 5. As shown in FIG. 10, the fixing member 13 can comprise an annular member 9' and a plurality of engaging claw walls 9" which protrude axially from the outer periphery of the annular member 9'. The claw walls 9" may be bent such that the aforementioned overlapping peripheral wall portions are held between the claw walls 9". Thus, the claw walls 9" are crimped against the peripheral wall portions. Further, the fixing member 13 may be shaped into clip members each having a U-shaped cross section. These clip members are mounted on the overlapping portions and crimped against them. Referring also to FIG. 10, the front ends of the resilient claw walls 5 are bent outward and raised to form engaging walls 11. In this case, the peripheral wall portion defining the large chamber 3 is provided with holes accommodating the engaging walls 11. Alternatively, recesses 12' are formed as shown in FIG. 10. In this case, when the tube P is mounted, the resilient claw walls 5 ride over the annular swelling wall P'. At this time, the claw walls 5 are shifted outwardly, and the engaging walls 11 are temporarily received in the recesses 12'. The existence of the raised engaging walls 11 increases the area with which the front ends of the resilient claw walls 5 are in contact with the annular swelling portions 5. This further stabilizes the connected structure. The socket member 8 is not limited to the structures shown in FIGS. 5-8. It may also be an incompletely annular body lacking a part of the base wall 8' as shown in FIG. 9. In the example shown in FIGS. 10 and 11, the socket body 8 has resilient claw walls 5 integral with the base wall 8'. Several such socket members 8 may be spaced substantially regularly from each other on the outer periphery of the jaw wall portion 3' formed at the rear fringe of the large chamber 3. In particular, the base wall of each socket member 8 is shaped into a rectangular form and takes a U-shaped cross section. The corresponding resilient claw wall 5 is continuous with the rectangular base wall to form a unit member as shown in FIGS. 10 and 11. In this case, the jaw wall 3' is provided with a groove 3'a in which the U-shaped base wall of each unit socket member 8 is fitted. After fitting the base wall of the socket member 8 in this groove, the member may be fixed with the fixing member 13.

As described thus far, in the second embodiment, the resilient claw walls 5 which protrude from the base wall 8' of the socket body 8 bears against, or fits in, the jaw wall portion 3' of the body 1. In this state, the socket member is fixed by the separate fixing member 13. Therefore, the second embodiment has the same advantages as those of the first embodiment. In addition, it is easier to mount the socket member 8 itself. Further, the diameter of the socket member 8 itself can be reduced further. This can shorten the axial length of the finished product. Since the fixed structure comprising the socket member 8 and the fixing member 13 is independent, the possibility that the tube P comes off or get loose decreases further.

A third embodiment of the invention is next described by referring to FIGS. 12-15. The third embodiment uses a socket member having resilient claw walls having a substantially U-shaped cross section, in addition to the separate fixing means already employed in the second example.

FIGS. 12 and 13 show different specific examples of the third embodiment of the invention. FIGS. 14 and 15A show the socket members shown in FIGS. 12 and 13, respectively. FIG. 15B illustrates the manner in which an annular swelling wall passes when the socket member shown in FIG. 15B is used. It is to be noted that like components are denoted by like reference numerals throughout various figures including FIGS. 1-11.

In FIGS. 12-15, the body of each connector is indicated by numeral 1. The body 1 is provided with a large stepped chamber 3 and a communication hole 4 formed along the axis of the body. The communication hole 4 is defined by a connecting tubular wall 2 for connection with a resinous tube or rubber hose (not shown) at the front end of the body 1. The stepped chamber 3 is continuous with the hole 4. A jaw wall 3' protruding outward is formed at the rear end of the chamber 3.

Plural seal ring members 6 made from rubber or the like are mounted in the large chamber 3. If desired, one or more spacers are interposed. A bush member 7 engages with the step portion of the chamber behind the seal ring members 6 to hold them. The bush member 7 assumes an annular form or is a short cylinder.

Referring to FIGS. 12 and 14, a socket member 8 is made from a resilient metal or resin and has an annular base wall 8'. A hole 10 extending axially is formed in the center. A plurality of elongated resilient claw walls 5 of a substantially U-shaped cross section are formed integrally with the socket member. The front ends of the claw walls 5 face forward. The outer ends of the claw members 5 are raised outwardly to form the annular base wall 8'.

While the annular base wall 8' bears on the jaw wall portion 3' of the body 1, engaging claw walls 9 of a separate fixing member 13 are mounted on the overlapping portions. Preferably, the fixing member 13 is crimped against them to fix them. The fixing member 13 can also take an annular or beltlike form. After this fixing member 13 is placed over the overlapping portions, the whole member may be crimped. A plurality of clip members of a U-shaped cross section may be formed and mounted on the overlapping portions. Then, the clip members are crimped against the overlapping portions to fix them. In the above description, the plural resilient claw walls 5 protrude from the annular base wall 8', i.e., they are integral with the base wall. Alternatively, as shown in FIGS. 10 and 11, a raised rectangular base wall 8" and a continuous, substantially U-shaped resilient claw walls 5 are combined into a unit. Such unit socket members 8 may be appropriately spaced from each other on the jaw portion 3'. The front end of each resilient claw wall 5 of a U-shaped cross section can be circumferentially shifted somewhat with respect to its base portion as shown in FIGS. 13 and 15A. In this case, the space between the inner surface of the large chamber 3 and the top of the annular swelling wall P' can be made somewhat larger than the thickness of the resilient claw wall 5. Therefore, the radial dimension of the body can be reduced to a minimum. Under this condition, the outwardly swelling wall P' located close to the connected end of the tube P is inserted into the large chamber 3. At this time, the resilient claw walls 5 are radially pushed as shown in FIGS. 14, 15A (by the phantom line), and 15B. Then, the annular swelling wall P' passes, whereby the original position is regained. The front ends of the resilient claw walls 5 make resilient contact with the tube, so that they are connected together rigidly. In the socket members shown in FIGS. 13 and 15A, the front ends of the resilient claw walls 5 are slightly shifted with respect to their base portions as described already. For this reason, when they are radially pushed by the annular swelling wall P', the wall thickness increases accordingly. This allows a great reduction in the diameter of the large chamber 3, which in turn contributes to miniaturization of the finished product.

As described thus far, in the third embodiment, the resilient claw walls 5 facing forward and having a substantially U-shaped cross section bear against the jaw wall portion 3' of the body 1. The outwardly raised portions are formed on the front of the annular base wall 8' of the socket member 8. While the raised portions abut against the jaw wall portion 3' of the body 1, the claw walls 5 are fixed by the separate fixing member 13. In the same way as in the second embodiment, the socket member 8 is fixed firmly. Further, it can be easily detached. Also, the shape of the resilient claw walls 5 having a substantially U-shaped cross section permits a reduction either in the diameter or in the radial dimension. In addition, the axial dimension of the body 1 of the manufactured product decreases. Consequently, the whole product according to the third embodiment can be made more compact than the products according to the first and second embodiments.

A fourth embodiment is next described by referring to FIGS. 16-18. The fourth embodiment is similar to the first embodiment except that the base wall of the socket member is formed independent of the resilient claw walls and that the claw walls are caused to engage the base wall in assembling the connector.

FIGS. 16 and 17 show one specific example of the fourth embodiment. FIG. 18 shows the annular base of the socket member shown in FIG. 16. FIG. 19 shows the annular base wall of the socket member. FIG. 20 shows one resilient claw wall of the socket member. It is to be noted that like components are indicated by like reference numerals in various figures including FIGS. 1-15.

In FIGS. 16-20, the body of the connector is indicated by numeral 1. The body 1 is provided with a large stepped chamber 3 and a communication hole 4 formed along the axis of the body. The communication hole 4 is defined by a connecting tubular wall 2 for connection with a resinous tube or rubber hose (not shown) at the front end of the body 1. The stepped chamber 3 is continuous with the hole 4. A jaw wall 3' protruding outwardly is formed at the rear end of the chamber 3. A plurality of seal ring members 6 made from an elastic material such as rubber are mounted in the large chamber 3. If desired, one or more spacers are interposed. A bush member 7 engages with the step portion of the chamber behind the seal ring members 6 to hold them. The bush member 7 is a ring having a jaw or a short cylinder.

A socket member 8 is made from a resilient metal or resin and has a base wall 8'. In the present example, as can be seen from FIGS. 17-20, resilient claw walls 5 are formed independent of the annular base wall 8' of the socket member 8.

Specifically, the annular base wall 8' is centrally provided with a hole 10 extending through it. Radially protruding, engaging claw walls 9 are formed on the outer periphery of the base wall 8' that are provided with grooves 8'a adequately circumferentially spaced from each other. Each resilient claw wall 5 has a U-shaped engaging wall 5' whose one end is engaged in one of the grooves 8'a. A step portion 15 is continuous with the engaging wall 5'. The resilient claw wall 5 has a raised wall at its front end. The other end of the claw wall 5 is inclined toward the central hole 10 and also toward the front after they have been engaged.

In assembling the connector for a tube of a small diameter, the engaging wall 5' formed on each resilient claw wall 5 of the socket member 8 is fitted in one of the grooves 8'a formed in the annular base wall 8'. These components are joined together by crimping claw walls 5. After bringing the annular base wall 8' into engagement with the jaw wall portion 3' of the base 1, the several engaging claw walls 9 protruding radially from the outer periphery of the base wall are crimped against the jaw portion 3'. In this way, the socket member 8 can be readily mounted to the body 1.

As described thus far, in the present example of the connector for connection with a tube of a small diameter, the annular base wall 8' constituting the socket member 8 is formed independent of the resilient claw walls 5. Hence, their wall thicknesses can be reduced. Since the engagement can be performed by crimping operation, the assembly is easy to carry out. In the resilient claw walls 5 assembled by engagement, the step portion 15 continuous with the engaging wall 5' is restrained by the inner wall of the rear end of the large chamber 3. Therefore, the resilience is increased. When the tube P is connected, the pressure applied to the annular swelling wall P' for engagement increases further. Consequently, the connection is made with greater certainty.

What is claimed is:

1. A connector for a tube having a small diameter and opposed first and second ends, said tube further including an outwardly swelling annular portion in proximity to the first end of the tube, said connector comprising:

a body defining a generally tubular wall having opposed front and rear axial ends, an axially extending communication hole formed in the front axial end of the tubular wall, a large stepped chamber formed in the rear axial end of the tubular wall of the body and communicating with the communication hole at the front end of the body, said chamber being dimensioned to receive the outwardly swelling annular portion of the tube, a jaw wall protruding outwardly from the rear end of the tubular wall, and annular seal means mounted in the chamber for providing sealing between the tube and the body, the seal means including a central aperture for receiving the first end of the tube and being dimensioned to be abutted by the outwardly swelling annular portion of the tube spaced from the first end thereof;

at least one socket member for engaging a side of the outwardly swelling annular portion of the tube facing the second end of the tube and thereby retaining the first end of the tube in the socket, said socket member including a base mounted against the rear axial end of the body and at least one resilient claw wall having a front end protruding forwardly from the base of the socket member such that the front end of the resilient claw wall extends into the chamber of the body, the length of each said claw wall being selected such that the front end thereof engages the outwardly swelling annular portion of the tube and retains the outwardly swelling annular portion of the tube against the annular sealing means; and a retaining member comprising an annular wall engaging a face of the base of the socket member opposite the body and a plurality of axially extending claw walls extending axially over the outer periphery of the socket member and the jaw wall of the base, each said engaging claw wall including a forward end portion bent radially inwardly into tight engagement with a forwardly facing portion of the jaw wall for securely retaining the socket member against the rear axial end of the body.

2. A connector as set forth in claim 1, wherein the base wall of the socket member is generally annular.

3. A connector as set forth in claim 1, wherein the front ends of the resilient claw walls are raised radially outwardly to form engaging walls for engaging the outwardly swelling annular portion of the tube, said body including recess means for receiving the engaging walls as the claw walls are biased outwardly upon insertion of the tube into the connector.

4. A connector as set forth in claim 1, comprising a plurality of socket members, wherein the base and the resilient claw walls of each said socket member are of unitary construction, the base being U-shaped and comprising a radially outwardly extending base wall and an axially forwardly extending engaging wall extending forwardly from the base wall, the jaw wall of the body being defined by a plurality of inwardly directed grooves spaced about the circumference thereof, the engaging wall of each said socket member being fitted in one of said grooves, and being fixed in the grooves by the retaining member.

5. A connector as in claim 4, wherein the retaining member includes a plurality of notches formed in peripheral portions of the annular wall thereof, and wherein the base of each said socket member comprises an engaging wall for engaging a corresponding groove in the retaining member.

6. A connector as set forth in claim 1, wherein the resilient claw walls are of a substantially U-shaped in axial cross section, such that a radially outer portion of each resilient claw wall protrudes generally rearwardly, and such that a radially inner portion of each said resilient claw wall protrudes generally forwardly.

7. A connector as set forth in claim 6, wherein the front ends of the resilient claw walls of the substantially U-shaped cross section are circumferentially shifted with respect to their base portions.

* * * * *